(12) United States Patent
Meroni

(10) Patent No.: US 6,830,769 B2
(45) Date of Patent: Dec. 14, 2004

(54) FLEXIBLE MOULD FOR CONFECTIONERY, BREAD-MAKING AND SIMILAR, WITH SUPPORT AND STIFFENING ELEMENT OF THE OUTER EDGE

(75) Inventor: Bruno Meroni, Lodi (IT)

(73) Assignee: Silital S.p.A., Vignate (IT)

( * ) Notice: Subject to any disclaimer, the term of this patent is extended or adjusted under 35 U.S.C. 154(b) by 0 days.

(21) Appl. No.: 10/706,383

(22) Filed: Nov. 12, 2003

(65) Prior Publication Data

US 2004/0096558 A1 May 20, 2004

Related U.S. Application Data

(63) Continuation of application No. 09/975,230, filed on Oct. 11, 2001, now abandoned.

(30) Foreign Application Priority Data

Oct. 18, 2000 (IT) .................................. MI20000590 U

(51) Int. Cl.[7] .................................................. A23P 1/00
(52) U.S. Cl. ........................ 426/512; 426/496; 426/515
(58) Field of Search .................................. 426/496, 512, 426/515; 425/440, DIG. 44; 249/134, 139

(56) References Cited

U.S. PATENT DOCUMENTS 3,662,693 A * 5/1972 Dana .......................... 426/515
5,443,856 A * 8/1995 Akutagawa et al. ......... 426/515

* cited by examiner

Primary Examiner—George C. Yeung
(74) Attorney, Agent, or Firm—Notaro & Michalos PC

(57) ABSTRACT

A flexible mold made of silicone for confectionery, bread-making or the like, can be used in traditional ovens and microwave ovens. The tray has a stiffened edge preferably of metallic wire dipped in the silicone or of plastic or metallic frame structure, co-stamped or manually inserted into the edge. This improves handling, especially with liquid products, while keeping those flexibility features that make it easy to remove fragile contents from the oven and to deform and flatten it in order to store it in reduced space.

13 Claims, 3 Drawing Sheets

FLEXIBLE MOULD FOR CONFECTIONERY, BREAD-MAKING AND SIMILAR, WITH SUPPORT AND STIFFENING ELEMENT OF THE OUTER EDGE

CROSS-REFERENCE TO RELATED APPLICATION

This application is a continuation of U.S. patent application No. 09/975,230 filed Oct. 11, 2001, now abandoned and the entirety of which is hereby incorporated by reference.

FIELD AND BACKGROUND OF THE INVENTION

The invention relates to flexible mold made of silicone for confectionery, bread-making or similar, particularly suited to the use both in traditional ovens and microwave ovens, consisting of a tray provided on the upper side, with an edge which extends outwardly, wherein this edge is equipped with a support and stiffening element, preferably consisting of a metallic wire dipped in the silicone or of plastic or metallic frame partially co-stamped at sight, or manually inserted into a corresponding seta provided in the edge.

This feature considerably improves the handling of the ray, especially when it contains very liquid products, keeping unchanged those flexibility features that make easier to take fragile contents out of the oven and to deform and flatten it in order to store it into a reduced space.

As it is known, the molds for confectionery and bread-making are always made of rigid material, such as for example metal like aluminum, or refractory materials such as ceramic or vitreous material, the latter used in particular in microwave ovens.

The rigid molds present several disadvantages, from the difficulty to take the product out of the mold without breaking it, to unsuitable dimensions when the trays must be stored.

These disadvantages can be overcome by means of flexible trays made of fabric of proper fibers coated by a synthetic material such as silicone. But also these trays present several disadvantages due to the difficulty to duly shape an unstretchable material such as the fabric, to obtain a tray with the required depth.

SUMMARY OF THE INVENTION

With the mold of the this invention, it is easier to take the product out of the mold, thanks to the elasticity and the flexibility of the material and it is likewise possible to store the molds in a reduced space, thanks to the deformability of the molds.

These known molds include a duly shaped tray, provided, on the upper side, with an edge, always of silicone, which can extend outwards. This edge allows one to easily grip the tray and take out the product. The silicone molds represent an innovative product which can be perfected.

It was noted that the considerable flexibility and elasticity of the material creates some difficulties when there is the need to handle the molds containing a product, especially if the product is very liquid.

Under the effect of the weight of the product, a very flexible mold tends to deform, and if it is lifted by the edge, as usual, there is the risk to split part of the product.

To remove such a disadvantage, this invention proposes a silicone mold having, near the edge, a support and stiffening element able to give the mold the resistance required to carry the weight of the product without being deformed, keeping the flexibility features which allow to guarantee other advantages listed above.

The mold according to the invention is characterized by the particular embodiment which improves the handling of the product, increasing its usefulness and practicality of use.

BRIEF DESCRIPTION OF THE DRAWINGS

The invention will be described in detail by way of example without any limitation thereto, with reference to the attached figures, in which.

DESCRIPTION OF THE PREFERRED EMBODIMENTS

With reference to the attached figures, 1 indicates, in its whole, a mold according to the invention, essentially consisting of a tray 2 in which the product to be cooked or heated is inserted and that is provided, on the upper side of its diverging side walls, with an edge 3 essentially consisting of a wing projecting outwards and which projection by a greater extent than its width. The bottom wall of tray 2 is flat.

Figure 1:
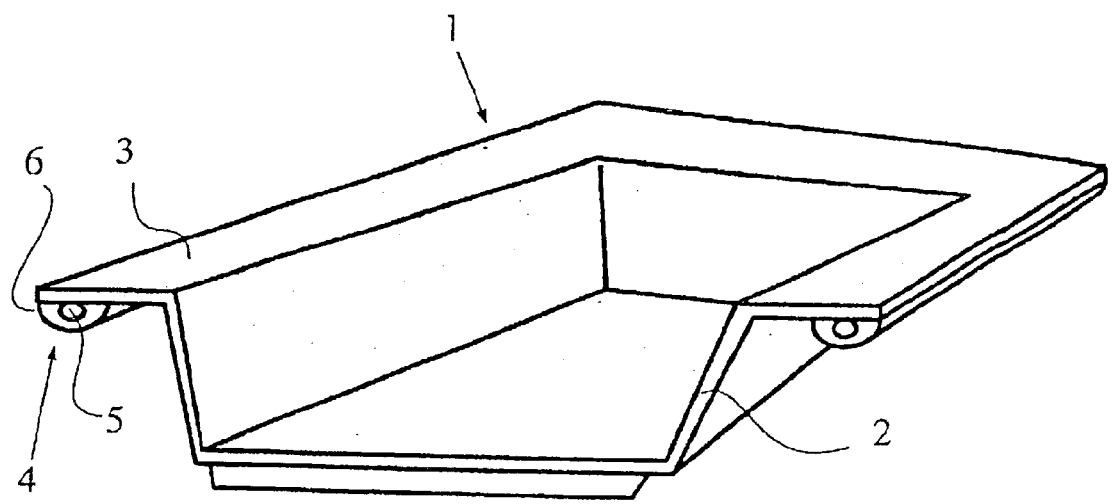
FIG. 1 is a section of a mold according to the invention.
Figure 2:
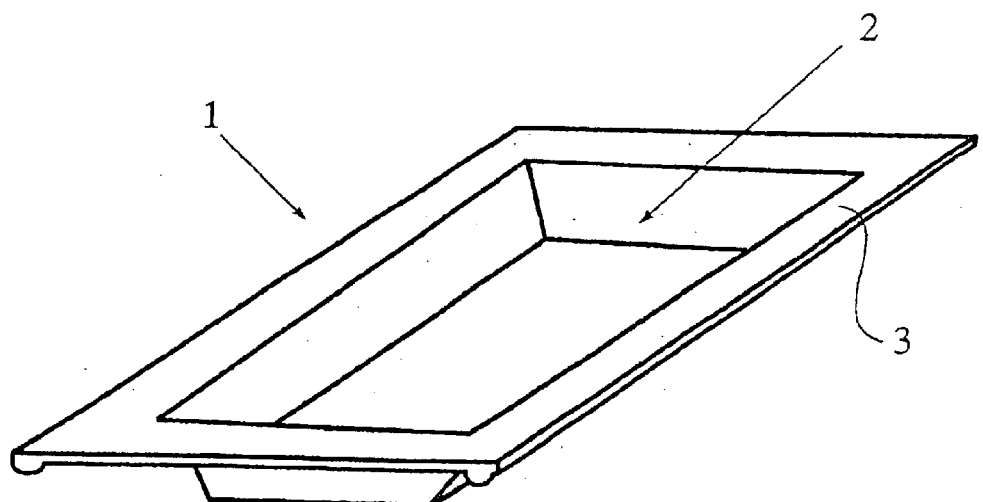
FIG. 2 is a perspective view of the mold of FIG. 1.

The tray 2 has a sheet-like form, as best illustrated in FIG. 2.

Both the tray 2 and the wing 3 are completely made of silicone.

The silicone is a material able to resist the temperatures of an oven and turned out to be suitable to this aim thanks to its resistance and flexibility features.

Peculiarity of the invention is to provide, near the perimetral area of the edge or wing 3, a support indicated by reference numeral 4, essentially consisting of a metallic element 5, preferably a metallic wire such as steel or the like, dipped into a silicone coating 6.

The fact of providing the metallic wire dipped into the silicone, allows one to use the mold even in a microwave oven.

The stiffening wire will have such dimensions as to allow the mold to not bend under the strain of the contents, but such as to allow in any case a sufficient flexibility of the wings 3 and of the entire tray body.

The material can be steel or in any case, other suitable plastic material.

The stiffening element 5 can be directly incorporated into the mold during the injection of the silicone material, or, if necessary, it may also be applied afterwards, duly inserted into a seat provided in the silicone.

Through this solution, the mold may be easily handled, gripping it by the edges, even when it contains a liquid product, because the resistance of the support element 5 allows the mold to keep its shape without bending under the strain of the content. The silicone flexibility will always allow one to easily take the product out, to press the mold and to store it taking up a minimum of space.

A person skilled in the art may make changes and different versions that must be considered included within the competence of this invention.

Figure 3:
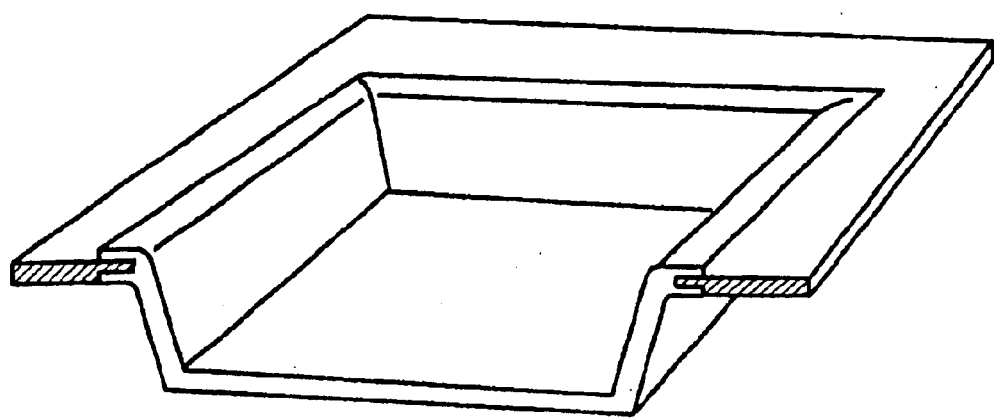
FIGS. 3 & 4 are perspective views, in section, of further forms of execution of the idea of solution.

In particular, in lieu of the metallic support element, one can provide a rigid plastic frame co-stamped with the silicon edge or taking the place of the latter, and which is applied for example by pressure, to the mold body, as shown in FIG. 3.

A further preferred embodiment of the invention provides for a reinforcing element consisting of a frame 10 (see FIG. 4) made of rigid or semi-rigid plastic material, which is inserted into a corresponding seat 11 made in the flexible edge 12 of the mold.

Preferably, the frame 10 is inserted into a seat provided at the lower surface of the edge.

The outer part 12 of the edge overlaps at least part of the frame 10, which is so held in place.

Figure 4:
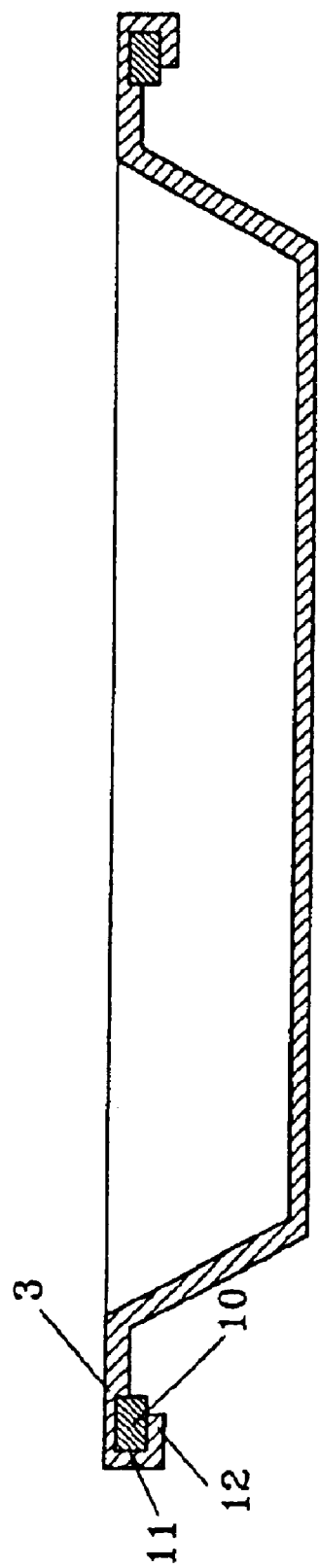

As shown in FIG. 4, the frame 10 and seat 11 have a generally rectangular cross-section.

What is claimed is:

1. A method for obtaining a molded food product, including confectionery and bread-making, from food deposited in a flexible mold comprising a flexible tray made of a silicone material, the method comprising the steps of:

providing the flexible tray with a bottom wall, side walls extending upwardly from the bottom wall, each side wall having an upper side provided with an edge including a silicone, peripheral outwardly projecting wing and a seat in said projecting wing;

inserting a stiffening element within said seat, to stiffen the projecting wing and improve the handling of the tray by said edge, while retaining flexibility of the tray, said flexibility, together with the dimensions of the stiffening element, being provided for flattening the flexible tray to take food previously disposed within the mold out of the flexible tray, the step of providing the flexible tray with an edge including a seat comprising providing the projecting wing with an outer part which, after the step of inserting, overlaps only a part of the stiffening element which is so held in a place within the so formed seat;

depositing said food within the flexible tray; molding said food into the tray to obtain said molded food product; and, taking the molded food product out of the mold, said step of taking out comprising the steps of pressing the flexible tray for flattening it and taking said food product out of the flattened tray.

2. The method of claim 1, wherein the step of providing the flexible tray with an outwardly projecting wing having a seat comprises providing the tray with said seat and said stiffening element, both having a rectangular cross section.

3. The method of claim 1, wherein the step of pressing the flexible tray comprises the step of gripping said flexible tray by said silicone, peripheral outwardly projecting wing and bringing one towards the other said bottom wall and said edge.

4. A method for obtaining a molded food product, including confectionery and bread-making, from food deposited in a flexible mold comprising a flexible tray made of a silicone material, the method comprising the steps of:

providing the flexible tray with a bottom wall, sheet-like side walls extending upwardly from the bottom wall, each sheet-like side wall having an upper side provided with an edge including a silicone, peripheral outwardly projecting wing and a seat in said projecting wing; the projecting wing having a stiffening element disposed therein, to stiffen the projecting wing and improve the handling of the tray by said edge, while retaining flexibility of the tray, said flexibility, together with the dimensions of the stiffening element, being provided for flattening the flexible tray to take food previously disposed within the mold out of the flexible tray;

depositing said food within the flexible tray;

molding said food into the tray to obtain said molded food product; and, taking the molded food product out of the mold, said step of taking out comprising the steps of pressing said stiffened projecting wing for flattening the flexible tray, and withdrawing said food product from the flattened tray.

5. The method of claim 4, wherein the step of providing the flexible tray with an edge including a seat comprises providing the projecting wing with an outer part which, after the step of inserting, overlaps only a part of the stiffening element which is so held in a place within the so-formed seat.

6. The method of claim 4, wherein the step of flattening the tray comprises the step of gripping said flexible tray by said silicone, peripheral outwardly projecting wing and bringing one towards the other said bottom wall and said edge.

7. A method for obtaining a molded food product, including confectionery and bread-making, from food deposited in a flexible mold comprising a flexible tray made of a silicone material, the method comprising the steps of:

providing the flexible tray with a bottom wall, side walls extending upwardly from the bottom wall, each side wall having an upper side provided with an edge including a silicone, peripheral outwardly projecting wing and a seat in said projecting wing;

then, inserting a stiffening element within said seat, to stiffen the projecting wing and improve the handling of the tray by said edge, while retaining flexibility of the tray, the step of providing the flexible tray with an edge including a seat comprises providing the projecting wing with an outer part which, after the step of inserting, overlaps only a part of the stiffening element which is so held in a place within the so-formed seat;

depositing food within the flexible tray;

molding said food into the tray to obtain said molded food product;

handling the tray by said stiffened projecting wing; and, storing the tray, the step of storing the tray comprising the step of taking said molded food product out of the tray.

8. The method of claim 7, wherein the step of storing the tray further comprises the step of flattening said tray by:

gripping it by said silicone, peripheral outwardly projecting wing; and, bringing one towards the other said bottom wall and said edge.

9. The method of claim 7, wherein the step of providing the flexible tray with an edge including a seat comprises providing the tray with said seat and said stiffening element, both having a rectangular cross section.

10. The method of claim 7, wherein the step of providing the flexible tray with an edge including a seat comprises providing the projecting wing with an outer part which, after the step of inserting, overlaps only a part of the stiffening element which is so held in a place within the so-formed seat.

11. A method for obtaining a molded food product, including confectionery and bread-making, from food deposited in a flexible mold comprising a flexible tray made of a silicone material, the method comprising the steps of:

providing the tray with a bottom wall, side walls extending upwardly from the bottom wall, each side wall having an upper side provided with an edge including a silicone, peripheral outwardly projecting wing and a seat in said wing;

then, inserting a stiffening element within said seat, to stiffen the projecting wing and improve the handling of the tray by said wing, while retaining flexibility of the tray;

depositing food within the flexible tray;

molding said food into the tray to obtain the molded food product; and, taking the molded food product out of the mold, said step of taking out comprising gripping the tray by the stiffened projecting wing and withdrawing the molded food product from the tray.

12. The method of claim 11, wherein the step of providing the flexible tray with an outwardly projecting wing having a seat comprises providing the projecting wing with an outer part which, after the step of inserting, overlaps only a part of the stiffening element which is so held in a place within the so-formed seat.

13. The method of claim 11, wherein the step of withdrawing the molded food product from the tray comprises the step of flattening said tray by bringing one towards the other said bottom wall and said edge.

* * * * *